(12) United States Patent
Burson

(10) Patent No.: US 6,341,628 B1
(45) Date of Patent: Jan. 29, 2002

(54) BATTERY FILLING SYSTEM

(76) Inventor: William C. Burson, 3140 P.O. Box 3140 West Osborn Rd., #146, Phoenix, AZ (US) 85017

(*) Notice: Subject to any disclaimer, the term of this patent is extended or adjusted under 35 U.S.C. 154(b) by 0 days.

(21) Appl. No.: 09/257,828

(22) Filed: Feb. 25, 1999

(51) Int. Cl.⁷ .................................................. B65B 3/00
(52) U.S. Cl. ........................ 141/67; 141/382; 137/209; 222/400.8
(58) Field of Search ............................. 141/59, 67, 382, 141/1; 137/206, 209, 211.5, 212; 222/1, 400.8; 215/309

(56) References Cited

U.S. PATENT DOCUMENTS

| | | | | |
|---|---|---|---|---|
| 1,577,539 A | * | 3/1926 | Polk | 215/309 |
| 2,161,776 A | * | 6/1939 | Orr | 137/209 |
| 2,771,101 A | * | 11/1956 | Thompson | 141/59 |
| 4,007,764 A | * | 2/1977 | Bandemor | 141/59 |
| 4,022,347 A | * | 5/1977 | Noble | 222/1 |
| 5,569,375 A | * | 10/1996 | Ridgeway | 141/59 |
| 5,573,045 A | * | 11/1996 | Akazawa | 141/67 |
| 5,617,891 A | * | 4/1997 | True | 137/212 |

* cited by examiner

Primary Examiner—J. Casimer Jacyna
(74) Attorney, Agent, or Firm—Martin L. Stoneman

(57) ABSTRACT

A battery filling system for use in efficiently adding water to, for example, those lead-acid batteries which are located in inconvenient or hard-to-reach places. The battery filling system includes a first flexible tube for use in transferring distilled water from the interior of a water-filled vessel to the hard-to-reach cell of a lead-acid battery. A second flexible tube transfers pressurized air from an external pressurized air source (typically human lungs) to the interior of the vessel in a quantity sufficient to cause the water to advance into and fill the first tube. A cap is used to snugly attach both tubes to the vessel. A means is also provided to minimize loss of air pressure from the vessel.

5 Claims, 1 Drawing Sheet

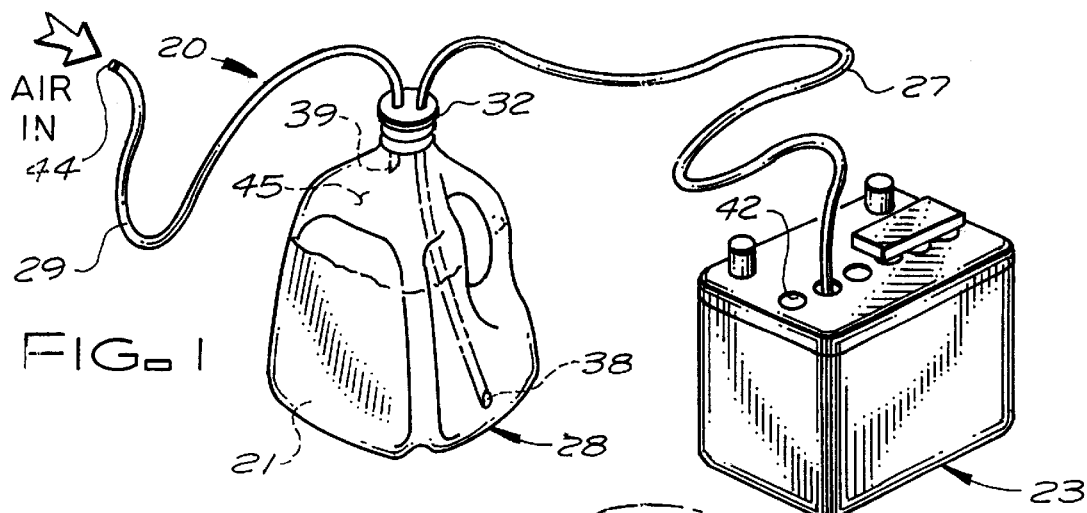
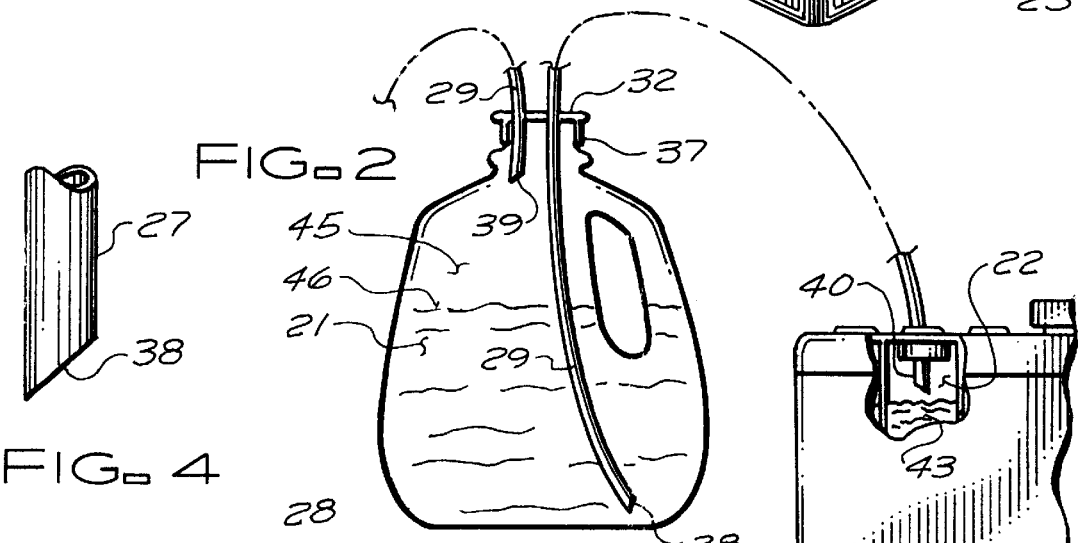
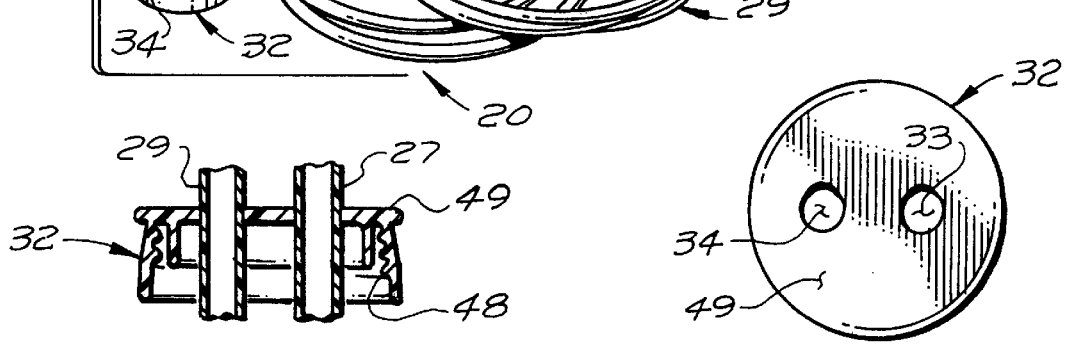

BATTERY FILLING SYSTEM

BACKGROUND OF THE INVENTION

1. Field of the Invention

This invention relates to providing a battery filling system. More particularly, this invention concerns a battery filling system for use in efficiently adding water to, for example, those lead-acid batteries which are located in inconvenient or hard-to-reach places.

2. Description of the Prior Art

Typically, the electrolyte levels in the cells of lead-acid batteries will decrease over time, necessitating occasional replenishment in order to restore the battery to an efficient operating condition. The process of replenishing electrolyte levels typically consists of adding distilled water to the subject cells until a pre-determined level is achieved. In some cases, the battery is in a relatively convenient location thereby allowing the owner/operator to easily add the distilled water with little if any inconvenience. In other cases, however, the battery is not readily accessible. In these cases it is often necessary that the battery either be removed from the machinery in order to add the distilled water or some other creative solution must be found in order to perform the necessary battery maintenance.

Applicant is aware of a number of prior art attempts for providing battery water-topping devices. For example, U.S. Pat. Nos. 5,803,138, 4,386,141, and 4,353,968 issued to, respectively, Oschmann et al, Weidner et al., and Boyle all teach battery water-filling systems which remain on the battery and which utilize float/valve arrangements for monitoring and automatically filling the cells of a battery. Though these systems may perform adequately, the fact that they require not only sufficient space adjacent the battery for unit attachment, but also sufficient space for a water container and the necessary water transfer tubing may make these systems impracticable for those machines having limited free space, such as a snowmobile or riding lawn mower. In addition, these devices may not be cost effective for those owners/operators who desire an inexpensive and simple method of providing water to hard-to-reach batteries. Thus, it is believed by the applicant that none of the prior art referred to herein will effectively accomplish the purpose of the present invention.

OBJECTS OF THE INVENTION

A primary object of the present invention is to fulfill the above-mentioned need by the provision of a battery filling system. A further primary object of the present invention is to provide such a system which is efficient, easy to use, easy to manufacture, inexpensive, and handy. Other objects of this invention will become apparent with reference to the following invention descriptions.

SUMMARY OF THE INVENTION

According to a preferred embodiment of the present invention, this invention provides a battery filling system for use with an external source of air pressure and a vessel containing water, comprising, in combination: a first conduit means for transferring such water from such vessel to such battery; a second conduit means for providing such vessel with a quantity of such air pressure sufficient to force such water into such first conduit means; and an attachment means for attaching such first conduit means and such second conduit means to such vessel. This invention further provides such a battery filling system wherein such attachment means comprises sealing means structured and arranged for substantially preventing, when such attachment means is applied to such vessel, loss of such air pressure from such vessel proximate such attachment means.

In addition, this invention provides for such a battery filling system wherein such first conduit means comprises a flexible first tube long enough to extend from a location of a such vessel to a location of a such battery; and, further, wherein such second conduit means comprises a flexible second tube having a first end and a second end, such first end being structured and arranged for coupling to such external source of such air pressure and such second end being structured and arranged for placement within such vessel. And, still further, it provides such a battery filling system wherein such attachment means comprises a cap structured and arranged for attachment to an opening in such vessel, such cap comprising: a first aperture structured and arranged to snugly receive such first conduit means; and a second aperture structured and arranged to snugly receive such second conduit means.

Additionally, it provides such a battery filling system wherein: such first conduit means comprises a flexible first tube long enough to extend from a location of a such vessel to a location of a such battery; and such second conduit means comprises a flexible second tube having a first end and a second end, such first end being structured and arranged for coupling to such external source of such air pressure and such second end being structured and arranged for placement within such vessel. And, the present invention provides such a battery filling system wherein: such first tube comprises at least one terminus cut at an angle, with respect to a longitudinal direction of such first tube at such terminus of such first tube, sufficient to assist a user in inserting such terminus of such first tube through such first aperture of such cap; and such second tube comprises at least one terminus cut at an angle with respect to a longitudinal direction of such second tube at such terminus of such second tube sufficient to assist a user in inserting such terminus of such second tube through such second aperture of such cap. And, still further, it provides such a battery filling system wherein: such first conduit means comprises an essentially plastic flexible first tube having a length of about four feet and having an outer diameter of about ¼ inch; such second conduit means comprises an essentially plastic flexible second tube having a length of about two feet and having an outer diameter of about ¼ inch; such first aperture having a diameter of about ¹⁄₁₆ inch less than the outer diameter of such first tube; and such second aperture having a diameter of about ¹⁄₁₆ inch less than the outer diameter of such second tube.

Even further, in accordance with a preferred embodiment thereof, this invention provides for a battery filling system, for use with an external source of air pressure and a battery having a cell opening, comprising, in combination: a storage means for holding water, such storage means comprising an interior portion and an opening; a quantity of water provided in such interior portion; an external source of air pressure; a first conduit means for transferring such water from such storage means to such battery; a second conduit means for providing such vessel with a quantity of such air pressure sufficient to force such water into such first conduit means; and an attachment means for attaching such first conduit means and such second conduit means to such vessel. And, it provides such a battery filling system wherein such attachment means comprises sealing means structured and arranged for substantially preventing, when such attachment means is applied to such vessel, loss of such air pressure from such vessel proximate such attachment means; also, it provides such a battery filling system wherein such first conduit means comprises a flexible first tube long enough to extend from such vessel to such cell of such battery; and, further, wherein such second conduit means comprises a flexible second tube having a first end and a second end, such first end being structured and arranged for coupling to such external source of such air pressure and such second end being structured and arranged for placement within such vessel.

In addition, this invention provides for such a battery filling system wherein such attachment means comprises a cap structured and arranged for attachment to such opening in such vessel, such cap comprising: a first aperture structured and arranged to snugly receive such first conduit means; and a second aperture structured and arranged to snugly receive such second conduit means; and, further, wherein: such first conduit means comprises a flexible first tube, having a first end and a second end, long enough to extend from such vessel to such battery; and such second conduit means comprises a flexible second tube having a first end and a second end, such first end being structured and arranged for coupling to such external source of such air pressure and such second end being structured and arranged for placement within such vessel. Further still, this invention provides for such a battery filling system wherein: such first tube comprises at least one terminus cut at an angle, with respect to a longitudinal direction of such first tube at such terminus of such first tube, sufficient to assist a user in inserting such terminus of such first tube through such first aperture of such cap; and such second tube comprises at least one terminus cut at an angle with respect to a longitudinal direction of such second tube at such terminus of such second tube sufficient to assist a user in inserting such terminus of such second tube through such second aperture of such cap.

In addition, this invention provides for such a battery filling system wherein: such cap is attached to such vessel at such opening; such first and second tubes are inserted, respectively, into such vessel through such respective first and second apertures in such manner that such respective first ends of such first and second tubes are inside such vessel and such respective second ends of such first and second tubes are outside such vessel; and such second end of such first tube is adjacent such cell of such battery; and, further still, wherein: such first conduit means comprises an essentially plastic flexible first tube having a length of about four feet and having an outer diameter of about ¼ inch; such second conduit means comprises an essentially plastic flexible second tube having a length of about two feet and having an outer diameter of about ¼ inch; such first aperture having a diameter of about $\frac{1}{16}$ inch less than the outer diameter of such first tube; and such second aperture having a diameter of about $\frac{1}{16}$ inch less than the outer diameter of such second tube.

Yet further still, in accordance with a preferred embodiment thereof, this invention provides for a method of providing a cell of a battery with water comprising the steps of: providing a vessel having a first and second opening; placing a quantity of water into such vessel in a quantity sufficient to fill such cell; inserting a first end of a first tube through such first opening and into such vessel, in such manner as to fill such first opening, and placing a second end of such first tube adjacent such cell; providing an external source of air pressure; inserting a first end of a second tube through a second such opening, in such manner as to fill such opening, and into such water, and coupling a second end of such second tube to such external source of air pressure; wherein such vessel is essentially air-sealed but for such first and second openings; and providing such external source of air pressure to such second tube in such manner and in a quantity sufficient to force such water to flow through such first tube. And it provides such a method wherein such vessel comprises a cap and such first and second openings are situated in such cap; and, further, wherein such external source of air pressure are the mouth and lungs of a human.

BRIEF DESCRIPTION OF THE DRAWINGS

FIG. 1 is a perspective view of a preferred embodiment of the battery filling system of the present invention shown coupled to a water vessel and battery.

FIG. 2 is a partial cut-away view, in elevation, illustrating the arrangement of FIG. 1.

FIG. 3 is an exploded view, in perspective, illustrating the various components comprising the preferred embodiment of the present invention.

FIG. 4 is a partial cut-away view illustrating the preferred shape of each end of the first and second tubes.

FIG. 5 is a plan view of the preferred cap of the present invention.

FIG. 6 is a cross-sectional view illustrating the relationship between the cap and the first and second tubes.

DETAILED DESCRIPTION OF A PREFERRED EMBODIMENT AND THE BEST MODE OF PRACTICE

With reference now to the Figures, shown in perspective and elevation, respectively, in FIGS. 1 and 2 is a preferred embodiment of the battery filling system 20 of the present invention being used to add water 21 (typically distilled) to a cell 22 of a battery 23. As will become apparent to those skilled in such art as the present disclosure progresses, the battery filling system 20 serves a useful and practical function of allowing a user to quickly and easily add water 21, to, for example, a hard-to-reach battery 23 found in either an automobile, boat, snowmobile, lawn tractor, or any other machine which requires a lead-acid battery for its operation.

Referring further to FIGS. 1 and 2, and introducing FIGS. 3 and 4, the battery filling system 20 of the present invention comprises a first tube 27 structured and arranged to transfer the water 21 from the water-holding vessel 28 (embodying herein storage means for holding water, such storage means comprising an interior portion and an opening) to a water-deficient cell 22 of battery 23. The first tube 27 (embodying herein a first conduit means for transferring such water from such vessel to such battery) preferably comprises flexible plastic tubing having a preferred length of approximately four feet and a preferred outer diameter of approximately ¼-inch. Also shown is a second tube 29, preferably comprising similar flexible plastic tubing having a preferred length of approximately two feet and a preferred outer diameter of approximately ¼-inch, which is structured and arranged to transfer air pressure from an external air pressure source (not shown, but typically a human blowing air into second tube 29) to a vessel 28. The second tube 29 embodies herein a second conduit means for providing such vessel with a quantity of such air pressure sufficient to force such water into such first conduit means.

Each of the respective tubes 27 and 29 are (in use) coupled, as shown, to the vessel 28 by means of a cap 32, preferably comprising a plastic material, such as the type readily available for use in sealing a typical one-gallon distilled water container (embodied herein by vessel 28). It is presently highly preferred that such cap 32 have a nominal diameter of about 1⅜ inches and be structured and arranged for air-tight capping when applied to a such vessel 28 in its typical form today. Then cap 32 as hereinafter more particularly described may be made efficiently in quantity and/or sold in kit form since at the present time a typical distilled water jug (i.e., a vessel 28) typically possesses a nominal spout diameter of about 1⅜ inches. As will be disclosed more fully hereinafter with respect to FIGS. 5 and 6, the cap 32 is provided with a first aperture 33 (see FIG. 3) sized to snugly receive said first tube 27, and a second aperture 34 (see FIG. 3) sized to snugly receive said second tube 29. The cap 32 embodies herein an attachment means for attaching such first conduit means and such second conduit means to such vessel.

Filling a water-deficient cell 22 of a hard-to-reach battery 23 is both a simple and efficient process when using the battery filling system 20 of the present invention. The first step consists of attaching, in well-known ways, the cap 32 to the matching spout 37 of the vessel 28. It is preferred that the there exists a tight connection between the cap 32 and the spout 37 so as to minimize pressure loss from the vessel 28 proximate the vessel opening (not shown) located at spout 37 when the vessel is pressurized in accordance with the following procedure. This arrangement embodies herein an arrangement wherein such attachment means comprises sealing means structured and arranged for substantially preventing, when such attachment means is applied to such vessel, loss of such air pressure from such vessel proximate such attachment means. Next, the first end 38 of the first tube 27 is inserted into first aperture 33, in such a manner as to fill the first aperture 33, so that the first end 38 lies entirely within the water 21. In a like manner, the first end 39 of the second tube 29 is inserted into the second aperture 34, in such a manner as to fill the second aperture 34, so that the first end 39 lies entirely within the vessel 28.

To facilitate inserting each respective tube 27 and 29 into a respective aperture 33 and 34, the ends 38 and 39 may be beveled as shown in FIG. 4 (first end 38 of first tube 27 shown for illustrative purposes). The beveling of ends 38 and 39 embodies herein an arrangement wherein such first tube comprises at least one terminus cut at an angle, with respect to a longitudinal direction of such first tube at such terminus of such first tube, sufficient to assist a user in inserting such terminus of such first tube through such first aperture of such cap; and such second tube comprises at least one terminus cut at an angle with respect to a longitudinal direction of such second tube at such terminus of such second tube sufficient to assist a user in inserting such terminus of such second tube through such second aperture of such cap.

Next, the second end 40 of the first tube 27 is placed adjacent the battery cell opening 42 of the cell 22 to be filled, as shown best in FIG. 2. To avoid possible damage to the first tube 27 and/or the user, it is highly recommended that care be taken so as to avoid the second end 40 from contact with the acidic solution 43 within cell 22, preferably keeping end 40 above the top surface of the battery 23. The arrangement disclosed hereinabove embodies herein an arrangement wherein such cap is attached to such vessel at such opening; such first and second tubes are inserted, respectively, into such vessel through such respective first and second apertures in such manner that such respective first ends of such first and second tubes are inside such vessel and such respective second ends of such first and second tubes are outside such vessel; and such second end of such first tube is adjacent such cell of such battery.

Transferring the water 21 in vessel 28 to a cell 22 is accomplished by coupling the second end 44 of the second tube 29 to an external air source (not shown). In the present invention, human lungs comprise a simple and convenient source of external air pressure in which the user need only blow into the second end 44 in order to increase the pressure within the interior portion 45 of vessel 28. This increase in pressure in vessel 28, in turn, causes the water 21 to advance into and fill the first tube 27. With the vessel 28 positioned at or above the level of the battery 23, a point is reached in which the well-known "siphoning effect" takes place in which the water 21 flows freely through the first tube 27 without any further need to pressurize vessel 28. Upon filling the cell 22 to the appropriate fluid levels, the user need only lift second end 40 above the vessel water level 46 in order to stop the flow of water 21 in the first tube 27. If it is more convenient for the user, the user may also use a finger to close off the first tube 27 at the second end 40 near which the user is holding and positioning first tube 27 and thus stop the flow of water 21 out the second end 40. Also, if it is more convenient to the user, the user may lower vessel 28 to stop the water flow and lift vessel 28 to start such flow, as desired, in a manner well known in the "siphon" art.

Shown in FIGS. 5 and 6 are, respectively, a plan view and cross-sectional view (further showing the arrangement of tubes 27 and 29) illustrating the details of cap 32. As disclosed previously with respect to FIG. 1, the cap 32 is of the type commonly manufactured for attachment to a typical spout 37 of a one gallon distilled water bottle. Attachment of the cap 32 to the spout 37 is typically accomplished by either a "snap-on" type connection in which the cap 32 is provided with a series of inner ridges 48 which are structured and arranged in well-known ways to register with corresponding ridges (not shown)on spout 37, or by a typical screw-thread arrangement (not shown). To help further ensure that the vessel 28 remains sufficiently sealed against pressure loss, it is preferred that each of the first and second apertures 33 and 34, which are provided on the top surface 49 of cap 32, be sized so as to have an outer diameter of preferably ¹⁄₁₆-inch less than the outer diameter of each respective tube 27 and 29, thereby providing a sufficiently snug and airtight connection. The cap 32 of the type described herein is commonly provided with a thin plastic top surface 49, typically in the order of 0.04 inch, which is sufficiently elastic so as to permit each respective aperture 33 and 34 to accommodate the slightly larger tubes 27 and 29. This arrangement embodies herein an arrangement wherein such attachment means comprises sealing means structured and arranged for substantially preventing, when such attachment means is applied to such vessel, loss of such air pressure from such vessel proximate such attachment means.

Although applicant has described applicant's preferred embodiments of this invention, it will be understood that the broadest scope of this invention includes such modifications as diverse shapes, sizes and materials. Such scope is limited only by the below claims as read in connection with the above specification. Further, many other advantages of applicant's invention will be apparent to those skilled in the art from the above descriptions and the below claims.

What is claimed is:

1. A battery filling system kit for use with an external source of temporary air pressure and a water bottle of the type having a removable cap and being available commercially and containing water, comprising, in combination:
   (a) a first conduit suitable to transfer water from the water bottle to a battery filling position;
   (b) a second conduit suitable to provide the water bottle with a quantity of the temporary air pressure from the external source sufficient to fill said first conduit with water from the water bottle; and
   (c) a replacement cap for the water bottle suitable to temporarily hold an end of said first conduit and an end of said second conduit within the water bottle;
   (d) wherein said replacement cap comprises a sealer suitable to substantially prevent, when said replacement cap is applied to the water bottle, loss of the temporary air pressure from the water bottle proximate said replacement cap;
   (e) whereby a user may cause a "siphon effect" from the water bottle through said first conduit and through the battery-filling position by the user providing the temporary air pressure into the water bottle when containing water and with said first and second conduits held by said replacement cap sealing the water bottle;
   (f) wherein:
      (i) said first conduit comprises a flexible first tube long enough to extend from a location of the water bottle to a location of the battery-filling position; and
      (ii) said second conduit comprises a flexible second tube having a first end and a second end, said first end being structured and arranged for coupling to the external source of the temporary air pressure and said second end being structured and arranged for placement within the water bottle;
   (g) wherein said replacement cap comprises a cap structured and arranged for capping an opening in the water bottle, said replacement cap comprising:
      (i) a first aperture structured and arranged to snugly receive said first conduit, and
      (ii) a second aperture structured and arranged to snugly receive said second conduit;
   (h) wherein
      (i) said first conduit comprises at least one terminus cut at an angle, with respect to a longitudinal direction of said first conduit at said terminus of said first conduit, sufficient to assist a user in inserting said terminus of said first conduit through said first aperture of said cap; and
      (ii) said second conduit comprises at least one terminus cut at an angle, with respect to a longitudinal direction of said second conduit at said terminus of said second conduit, sufficient to assist a user in inserting said terminus of said second conduit through said second aperture of said cap.

2. The battery filling system kit according to claim 1 wherein:
   (a) said first conduit comprises an essentially plastic flexible first tube having a length of about four feet and having an outer diameter of about ¼ inch;
   (b) said second conduit comprises an essentially plastic flexible second tube having a length of about two feet and having an outer diameter of about ¼ inch;
   (c) said first aperture has a diameter of about 1/16 inch less than the outer diameter of said first tube; and
   (d) said second aperture has a diameter of about 1/16 inch less than the outer diameter of said second tube.

3. The battery filling system kit according to claim 2 wherein
   said replacement cap has a nominal diameter of about 1⅜ inches and is structured and arranged for air-tight capping, but for said apertures, when applied to the water bottle comprising a typical distilled water jug of the type having a nominal spout diameter of about 1⅜ inches.

4. A battery filling system, for use with an external source of temporary air pressure and a battery having a cell opening, comprising, in combination:
   (a) a water bottle for holding water, said water bottle comprising an interior portion and a closeable opening;
   (b) a quantity of water provided in said interior portion;
   (c) a first conduit suitable to transfer said water from said water bottle to a battery filling position;
   (d) a second conduit suitable to provide said interior portion of said water bottle with a quantity of said temporary air pressure sufficient to force said water into said first conduit so as to cause a "siphon effect" through said first conduit; and
   (e) a holder suitable to hold a first end of said first conduit and a first end of said second conduit within said interior portion of said water bottle and to close said closeable opening;
   (f) wherein said holder comprises a sealer structured and arranged for substantially preventing, when said holder is applied to said water bottle, loss of said temporary air pressure from said interior portion of said water bottle proximate said holder;
   (g) wherein said holder comprises a replacement cap structured and arranged for attachment to said closeable opening in said water bottle, said replacement cap comprising:
      (i) a first aperture structured and arranged to snugly receive said first conduit; and
      (ii) a second aperture structured and arranged to snugly receive said second conduit;
   (h) wherein
      (i) said first conduit comprises a flexible first tube, having a first end and a second end, long enough to extend from said interior portion of said water bottle to said battery-filling position; and
      (ii) said second conduit comprises a flexible second tube having a first end and a second end, said first end being structured and arranged for coupling to said external source of said temporary air pressure and said second end being structured and arranged for placement within said interior portion of said water bottle;

(i) wherein:
(i) said first tube comprises at least one terminus cut at an angle, with respect to a longitudinal direction of said first tube at said terminus of said first tube, sufficient to assist a user in inserting said terminus of said first tube through said first aperture of said replacement cap; and
(ii) said second tube comprises at least one terminus cut at an angle, with respect to a longitudinal direction of said second tube at said terminus of said second tube, sufficient to assist a user in inserting said terminus of said second tube through said second aperture of said replacement cap.

5. The battery filling system according to claim 4 wherein:
(a) said replacement cap is attached to said water bottle at said closeable opening;
(b) said first and second tubes are inserted, respectively, into said water bottle through said respective first and second apertures in such manner that said respective first ends of said first and second tube are inside said water bottle and said respective second ends of said first and second tube are outside said water bottle; and
(c) said second end of said first tube is structured and arranged to be placed in a battery-filling position of the battery.

* * * * *